Nov. 29, 1927.  
W. S. AUSTIN  
1,651,312  
SEED AND FERTILIZER DISTRIBUTOR  
Filed Oct. 2, 1926  5 Sheets-Sheet 2
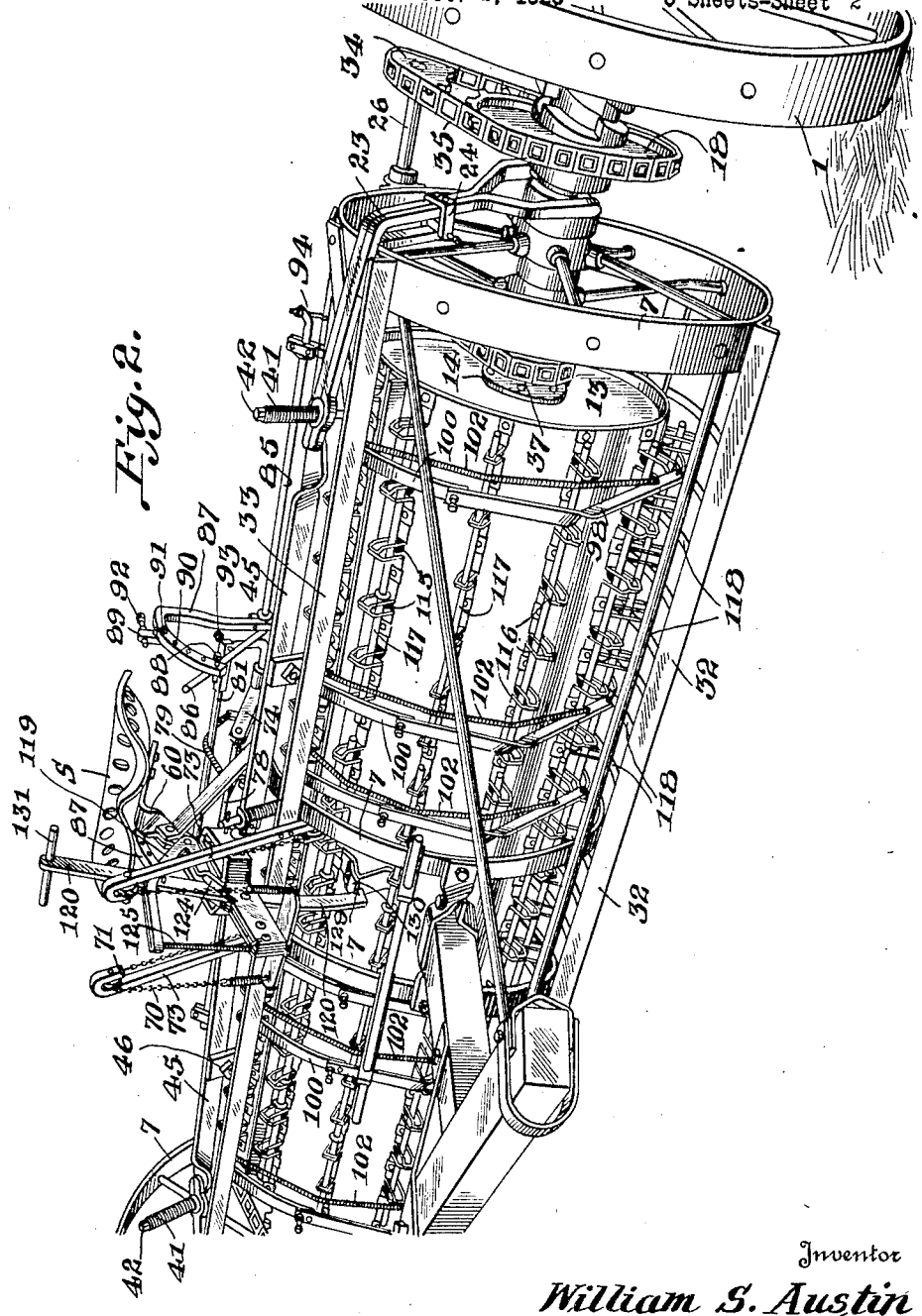
Inventor  
William S. Austin  
By Mason Fenwick Lawrence  
Attorneys

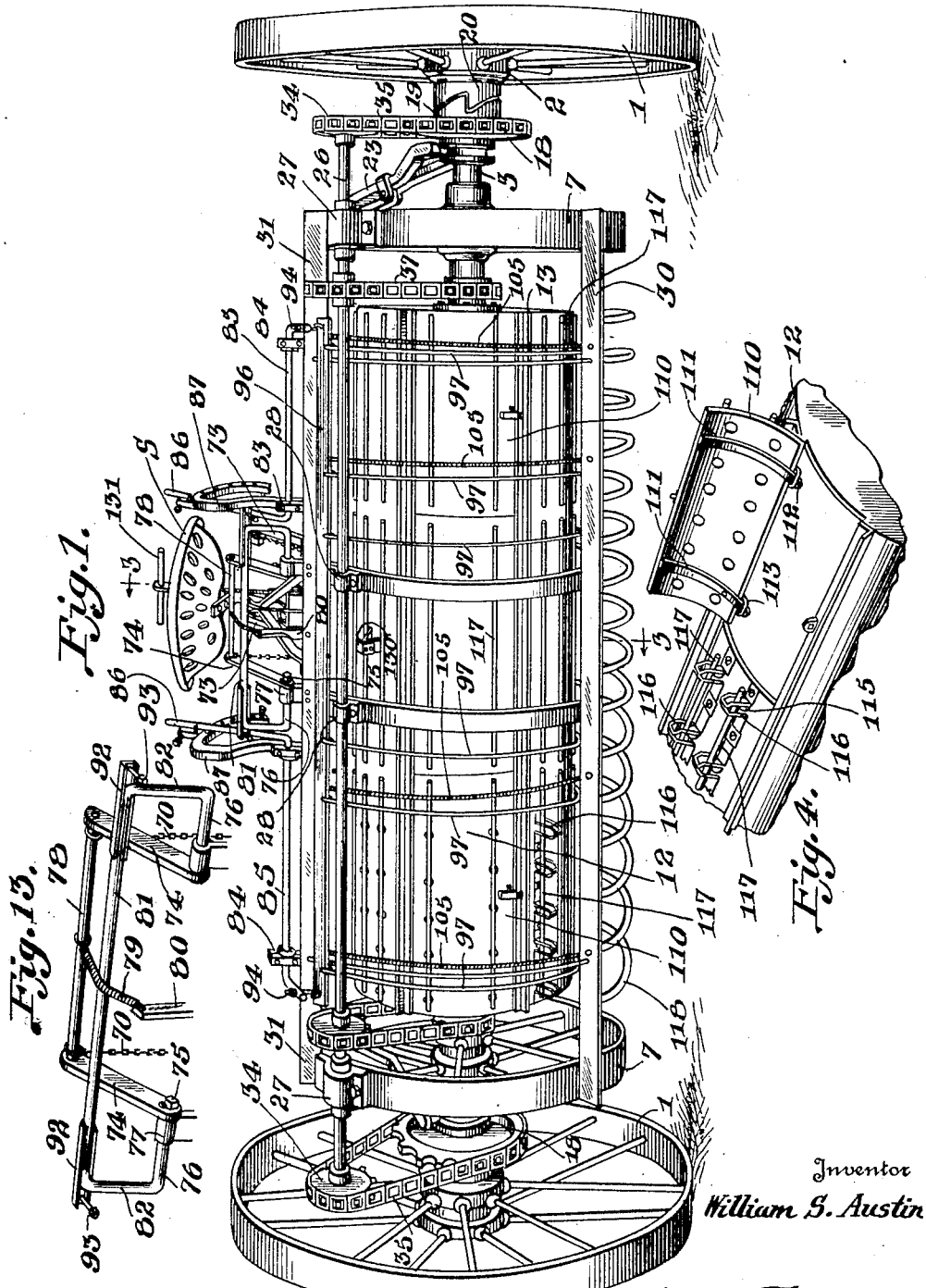

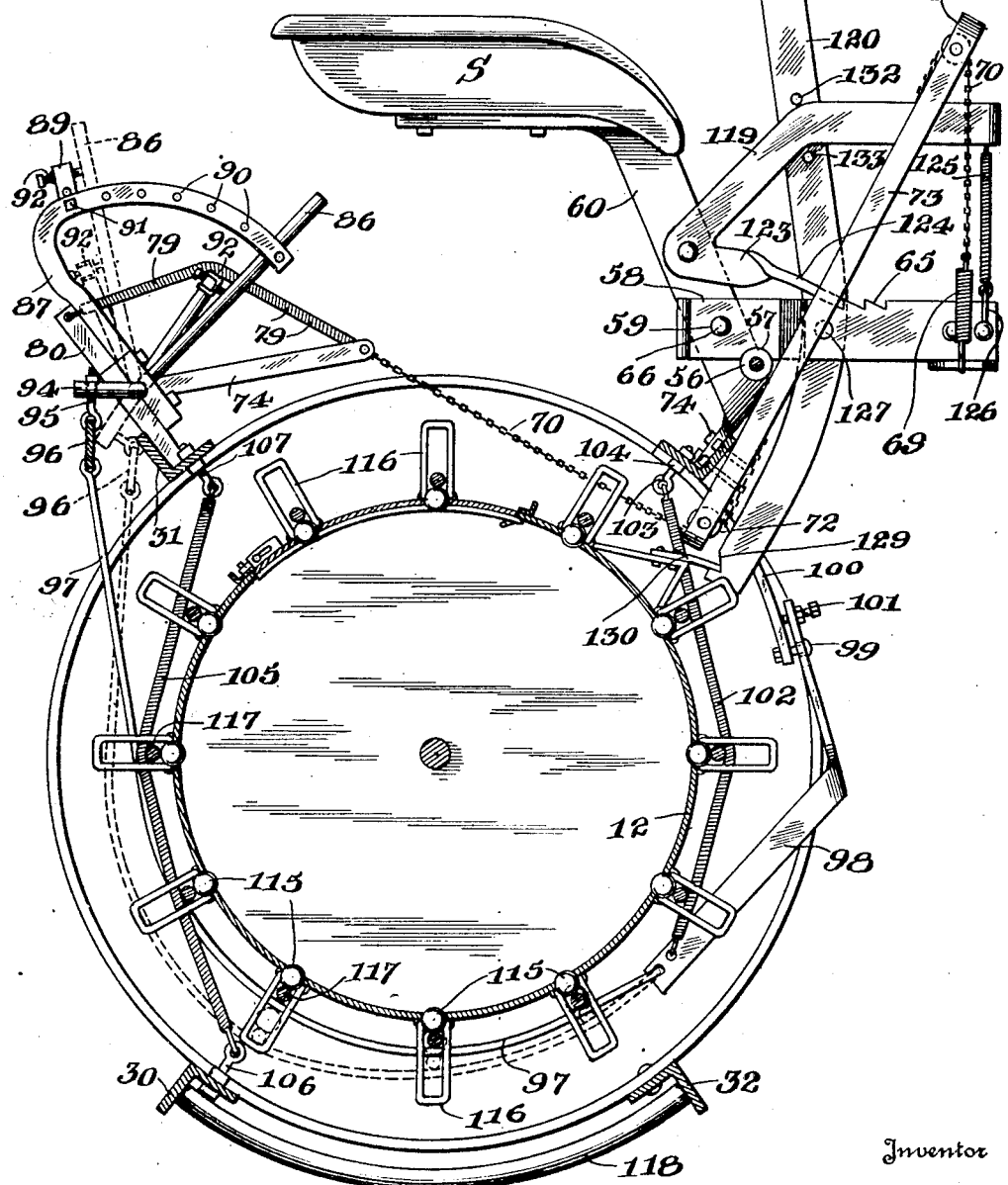

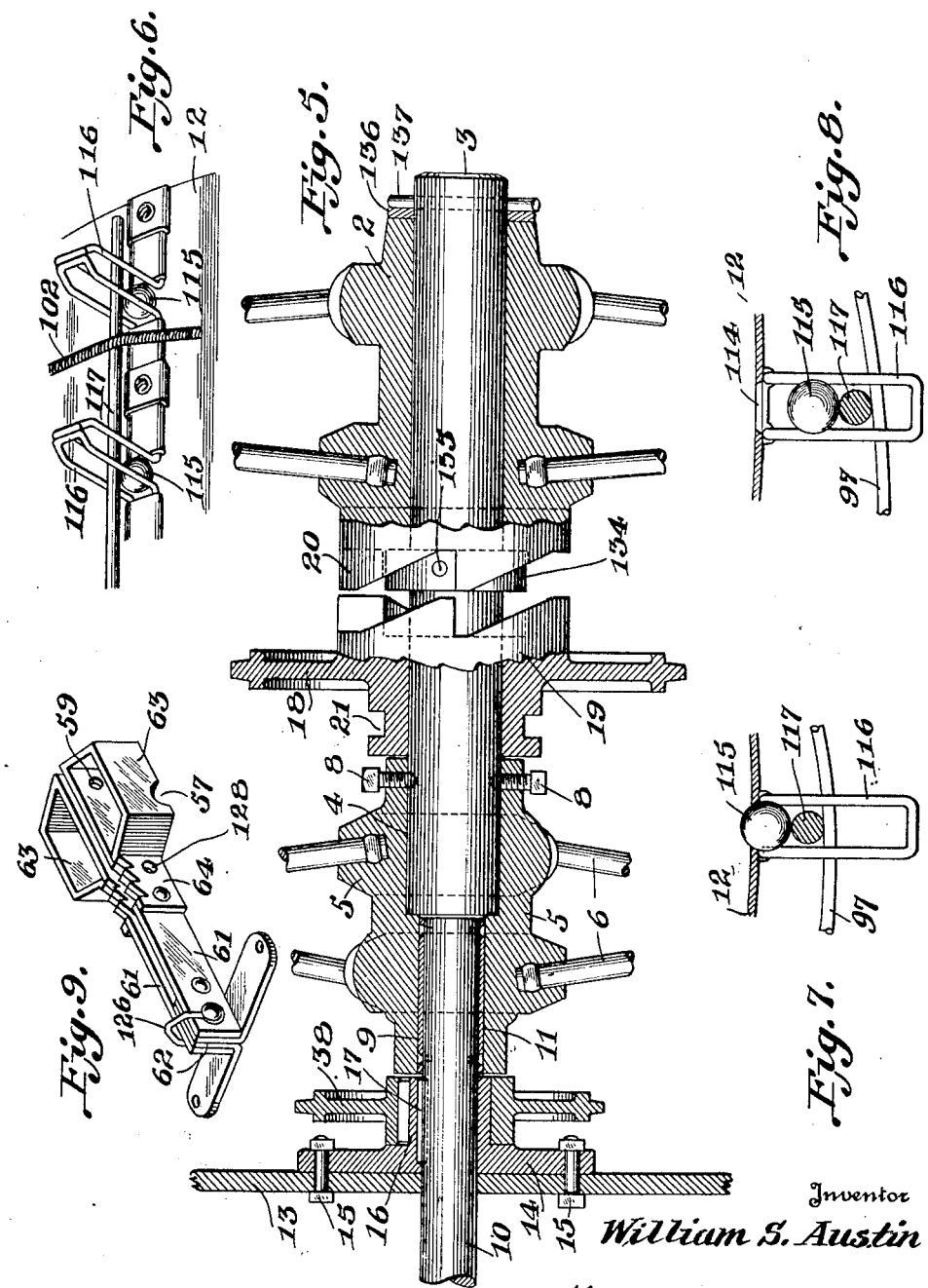

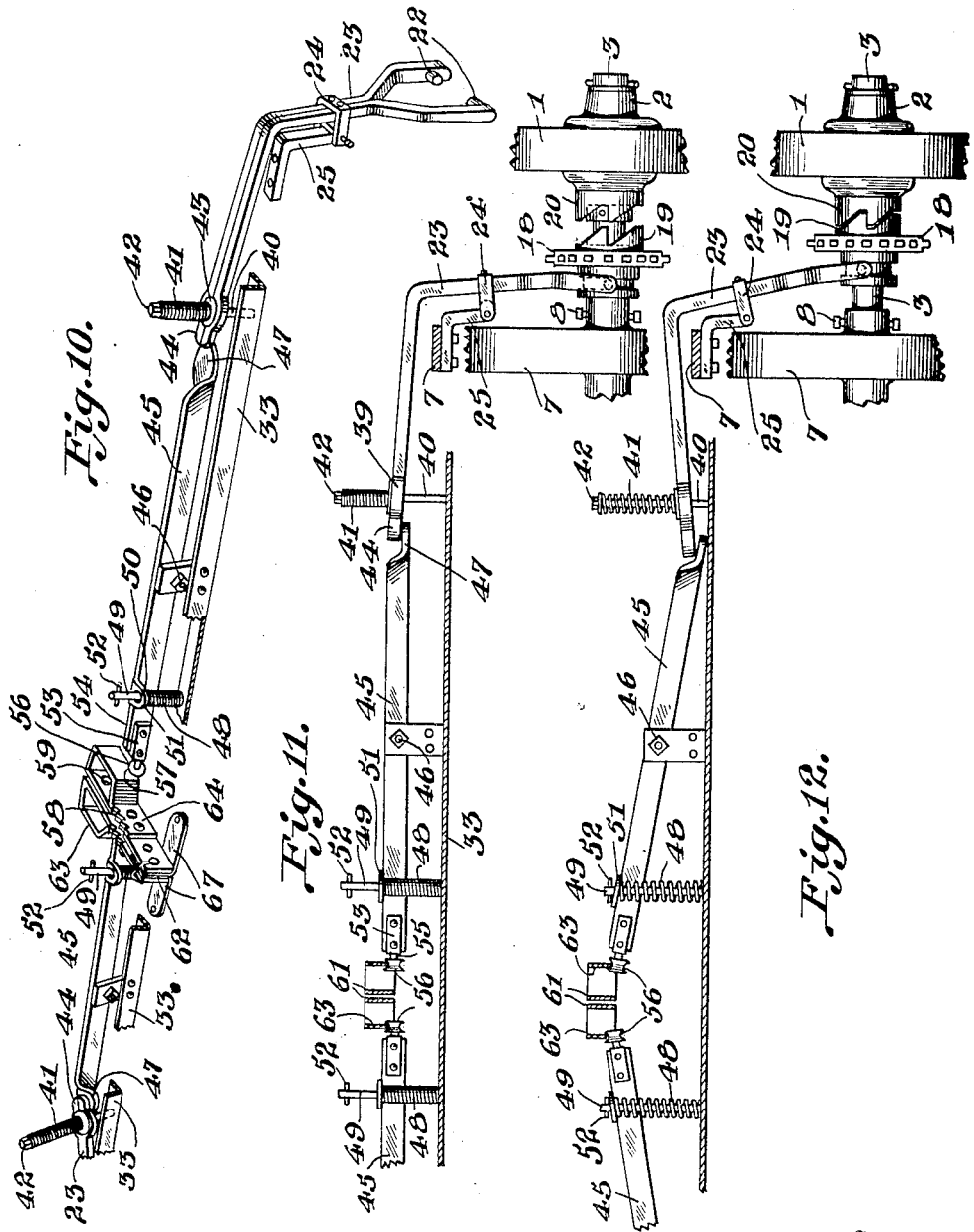

Patented Nov. 29, 1927.

1,651,312

UNITED STATES PATENT OFFICE.

WILLIAM S. AUSTIN, OF SOUTH PARIS, MAINE.

SEED AND FERTILIZER DISTRIBUTOR.

Application filed October 2, 1926. Serial No. 139,117.

This invention relates to machines for distributing fertilizer or seeds.

The object of this invention is to provide devices of this kind with means whereby the distribution of seeds or fertilizer will be more efficiently performed than is possible with devices heretofore known in the art.

A further object is to provide devices of this type with means whereby the operator can readily control the operation from a centrally located operator's seat.

Other objects will appear as the detailed description proceeds.

Referring to the drawings,

Fig. 1 is a rear perspective view of the machine;

Fig. 2 is a front perspective view thereof;

Fig. 3 is a section on the line 3—3 of Fig. 1;

Fig. 4 is a fragmentary perspective view of part of the drum with a door connected thereto and shown in open position;

Fig. 5 is a fragmentary central vertical section through the clutch mechanism mounted on the distributing drum and driving shafts of the invention.

Fig. 6 is a fragmentary perspective view of the valve mechanism controlling the distribution of seed or fertilizer from the drum;

Fig. 7 is a fragmentary detail showing valve controlling mechanism in valve closing position;

Fig. 8 is a similar detail view illustrating said mechanism with the valve in open position;

Fig. 9 is a perspective view of the main operating lever of this invention;

Fig. 10 is a perspective view of the linkage which controls the operation of the machine from the operator's seat;

Fig. 11 is an elevation of this linkage as connected up to the clutch mechanism of the invention; and, Fig. 12 is a plan view of the mechanism shown in Fig. 11.

Fig. 13 is a fragmentary perspective view to an enlarged scale of the discharge valve control mechanism of this invention.

The machine shown in the drawing has similar elements symmetrically arranged relative to the center line 3—3 (Fig. 1) passing through the driver's seat.

Similar parts on opposite sides of this line will therefore be designated by the same reference characters with the understanding that similar symmetrical elements perform the same function on their respective sides of the machine.

Each supporting wheel 1 has its hub 2 rotatably mounted on one end of the clutch shaft 3; and this clutch shaft 3 (see Fig. 5) extends with tight fit into the bore 4 in the hub 5 of a spider having spokes 6 radiating from said hub 5 to carry the spider rim 7 and bolts (Fig. 5) to fix the hub 5 securely to shaft 3.

The bore 4 extends only halfway through hub 5 and is coaxial with a smaller bore 9 in which the end of the drum shaft 10 is mounted to rotate, a bearing bushing 11 being suitably riveted or otherwise secured to the said end to take up wear.

The drum 12 has its end 13 fixed to its shaft 10 by means of a plate 14 which is bolted to said end by bolts 15 and is provided with a hub 16 secured by key 17 to shaft 10.

The drive of wheels 1 is transmitted on each side of the machine by means of a sprocket wheel 18 formed integrally with a clutch member 19 mounted rotatably on shaft 3 between hubs 2 and 4 (see Fig. 5) and adapted to be slid along shaft 3 into and out of operative engagement with the cooperating clutch member 20 (integral with the hub 2). The clutch member 19 is provided with the annular groove 21 adapted to receive the pins 22 (see Fig. 10) of a bent clutch operating lever 23 fulcrumed intermediate its ends in a strap 24 bolted suitably to one end of the bracket 25 fixed to and depending from the spider rim 7 (see Figs. 11 and 12).

A drum driving countershaft 26 extends clear across the rear of the machine (see Fig. 1) and is supported rotatably in bearings 27 and 28 mounted on the spiders 7 and on the intermediate arcuate supporting straps 29, which form part of the skeleton frame supporting structure and are riveted or otherwise secured to the longitudinal channel irons 30, 31, 32 and 33 which have their opposite ends secured to the spider rims 7 at opposite sides of the machine. The shaft 26 is prevented from moving axially in its bearing by any well-known suitable means and has mounted on each end thereof a sprocket wheel 34 in mesh with an endless sprocket chain 35 which also meshes with the clutch sprocket wheel 18.

The shaft 26, between the spider 7 and end 13 of the drum 12, has the sprocket wheel 36 fixed thereto, and the endless chain 37 meshes therewith to impart the rotation thereof to the sprocket wheel 38 which is keyed on to the hub 16 of the plate 14.

From the description so far, it will be apparent that when the clutch elements are engaged as shown in Fig. 1, the rotation of wheels 1 will be transmitted to the drum 12 by means of the sprocket wheels 18, 34, 36 and 38, shaft 26 and chains 35 and 37, and that the ratio between the rotation of the wheels 1 and drum 12 may be predetermined as desired by using different sizes of sprocket wheels.

The clutch lever 23 is bent over the end of the angle iron 33 and is provided with an aperture 39 through which a rod 40 suitably fixed to the iron 33 extends (see Figs. 2, 10, 11 and 12. A compression spring 41 surrounding rod 40 has one end thereof abutting against the head 42 and has its other end seated against the washer 43 on said rod and in contact with clutch lever to press the end 44 thereof downwardly toward angle iron 33.

In order to operate the clutch lever 23, a second angle iron lever 45 is pivoted intermediate its ends on a fulcrum 46 suitably fixed to the angle iron 33, and has its end 47 arranged under and in contact with the lower face of end 44 to raise the said end 44 and operate the clutch lever 23. The end 47 of lever 45 is maintained normally lowered toward the angle iron 33 by means of a compression spring 48 surrounding the lower part of a rod 49 which has one end thereof fixed to the angle iron 33 and slides freely through an aperture 50 formed in an abutment plate 51 extending laterally from the vertical web of angle iron 33. The spring 48 is interposed between the horizontal web of iron 33 and plate 51 and normally tends to raise the left hand arm of lever 45 toward the pin 52 fixed through the free end of rod 49 to limit the upward movement of lever 45.

A bracket 53 fixed to the end 54 of the lever 45 is shaped to provide a small stub shaft 55 on which a concave-surfaced roller 56 is rotatably mounted to seat in a correspondingly shaped curve 57 formed in one side of a lever 58 which is pivoted through hole 59 formed in the seat iron 60 (see Figs. 2 and 3).

The lever 58 comprises two straps 61 riveted together at one of their ends with spacer plates 62 between said ends. Each strap is bent around to form a substantially U-shaped portion 63 (in the lower edge of which the curve 57 is formed) which terminates in a plate 64 riveted to the straight part of plate 61. Ratchet teeth 65 are formed on the upper edge of plates 61 and 64 for a purpose to be described later.

The parts so far described are identical on each side of the plane perpendicular to the axis of the drum and passing through the vertical line 3—3 of Fig. 1, and are indicated by the same reference numerals.

The lever 58 (see particularly Figs. 2 and 3) is pivoted at one end by means of pin 66 passing through holes 59 to the seat iron 60, and has the spacer plates 62 bent at right angles to form foot plates 67. The outer end of each foot plate is provided with a hole 68 to receive one bent end of a spring 69, the other end of which is secured to a chain 70 passing around pulleys 71 and 72, fixed rotatably at opposite ends of a standard 73 secured to the angle iron 33 by rivets or bolts 74. The other end of a chain 70 is secured to one end of a lever arm 74 which has its other rigidly secured to the end 75 of a shaft 76 which projects through a bearing 77 secured to the angle iron 31 (see Figs. 1 and 3). A transverse rod 78 connects the free ends of lever arms 74 and a tension spring 79 connects the middle of this rod 78 to the upper end of a standard 80 having its other end fixed to the rear angle iron 31 (see Figs. 1 and 3), the said spring 79 passing over the center of a rod 81 which is integrally connected to the shaft 76 by means of the ends 82. Attention is directed to the fact that the members 74, 76, 82, 81 and 78 are fixed relative to each other and pivot as a whole about the bearings 77. The reason for this rigid connection will appear later.

On opposite sides of the line 3—3 the angle iron 31 has fixed thereto the spaced apart bearings 83 and 84 in alinement with the bearings 77 and in the bearings 83 and 84 a valve operating rod 85 is journaled. This rod 85 has a handle 86 bent up at right angles thereto and movable along an arcuate gage member 87 which is provided with a fixed stop 88 at one end thereof and with a micrometer stop 89 adjustable on said member 87 to limit the throw of said handle 86. The gage member 89 may be adjusted bodily along the arcuate gage 87, which is provided with a series of spaced apart apertures 90, each adapted to receive a bolt 91 to lock stop 89 in adjusted position. After this stop 89 is in the desired adjusted position, a finer adjustment may be had by using the adjusting stop screw 2 in the end of stop 89.

As shown in Figs. 2 and 13, the rod 81 has its opposite ends provided with members 92, projecting into the path of movement of the handles 86 and each member has a set screw 93 adjustable to contact with the handles 86.

The outer ends of rods 85 are bent to form crank arms 94 in which eyebolts 95 are pivoted (see Fig. 3) to carry a valve operating plate 96 extending across the rear of the drum. The plate 96 has a series of flexible rods 97 spaced along and fixed to the lower edge of plate 96 and extending under the drum 12 to the opposite side thereof to be connected to the lower ends of a corresponding member of bent supporting plates 98, each of which has its other end pivoted by bolt 99 to the end of a spring blade 100 carried by the angle iron 33. An adjusting screw 101 is screwthreaded into the upper end of each plate 98 to tilt the lower end thereof toward or from the drum in order to increase the tension on a valve controlling spring 102 which has one end connected to the lower end of a plate 98 and has its other end secured to an eyebolt 103 clamped by suitable nuts 104 to angle iron 33.

A similar series valve controlling springs 105 have their opposite ends secured to eyebolts 106 and 107 similarly clamped by nuts 108, 109 respectively to the angle irons 30 and 31 respectively.

The drum 12 is provided with doors 110 near each end thereof, each of which is provided with a pair of arcuate cleats 111 having turned over ends 112 adapted to be connected hingedly with hasps 113 fixed to the inner face of the drum. These doors give access to the inside of the drum for filling or cleaning it.

The drum 12 is provided with rows of apertures 114 adaptable to be closed by ball valves 115 which are mounted to slide in guide cages 116 and to be moved therein to closing position by the rods 117 when the latter are moved to valve closing positions by engagement with either springs 102 or 105 or the flexible member 97. The members 102 and 105 are side members designed to operate all rods 117 contacting therewith as the drum rotates to close the valves temporarily located adjacent them. The top rows of valves located between springs 102 and 105 close by gravity and the valves on the lower opposite side open by gravity, but may be closed by the lowermost rods 117 when desired by raising the plate 96 with the flexible rods 97 connected thereto.

Below each annular row of valves an arcuate skid 118 is fixed at its opposite ends to the angle irons 30 and 32, and serves not only to the annular row of valve cages but also to serve as a seed scatterer for the seeds falling thereon.

In order to operate the clutch and valve mechanism of this apparatus simultaneously, there is pivoted to the seat iron 60 (see Fig. 3) a cam member 119 which extends across the operating lever 120 and between two cam engaging pins 121 and 122 fixed to said lever 120. The lower end 123 is twisted to form a blade 124 designed to engage the teeth of rack 65 on the lever 58. The other end of cam member 119 connected by a spring 125 to a bail 126.

The operating handle 120 is pivoted intermediate its ends by a pivot bolt 127, suitably secured in the openings 128 of the foot lever 58. The lower end of the handle 120 is provided with a notch 129 adapted, when the handle is operated, to engage a stop 130 secured to the drum 12, and bringing the drum to a stop as soon as the clutch is disengaged. A cross bar 131 at the upper end of handle 120 facilitates the operation thereof, and pins 132 and 133 extend through the handle 120 to engage the upper and lower cam edge of the cam member 119.

In Fig. 5 there is shown a cylindrical sleeve 134 fixed by pin 135 to limit the movement of wheel 1 inwardly of the shaft 3, and a washer 136 with pin 137 limits the outward movement of wheel outwardly of said shaft 3.

As the machine is primarily intended to be drawn by draft animals, the usual timbers and braces therefor are shown in Fig. 2 as connected to the framework of the machine itself.

The parts are shown in Figs. 1 and 12 in the relative positions occupied by them when the clutch elements 19 and 20 are engaged; and are shown in Figs. 2, 3, 10 and 11 in positions assumed thereby when the clutch elements are disengaged and the distributing drum is locked against rotation.

With the parts in the drum locking position shown in Fig. 2, 3, 10 and 11, the handles 86 are in their lowest position (see Figs. 2 and 3) resting against stops 88 and therefore have turned the rods 85 to raise the crank arms 94 (see Figs. 2 and 3) and, through bolts 95 and plate 96, have pulled all the flexible rods or cables 97 (at the rear of the machine and shown clearly in Fig. 1) to raise all the rods 117 and thereby raise the three lowest ball valves from dotted line position (Fig. 3) to the closing positions shown.

The side springs 102 and 105 each keep three valves at the opposite sides of the drum closed at all times and the three valves at the top close by gravity.

The drum is locked against rotation by engagement of the notch 129 of handle 120 with the stop blade 130 on the drum (Fig. 3), and is held locked by the engagement of the blade 124 of cam member 119 with the teeth 65 of the foot lever 58. The spring 125 holds the lever 58 in tensioned engagement with the plate 124, and the springs 69 at the ends of foot plates 67, with the chains 70 passing over pulleys 71 and 72, to the free ends of levers 74, in conjunction with the spring 79 hold all the operating parts in spring tensioned relation to each other.

With all the operating parts in the drum locking positions just described, the clutch operating levers are also held in tensioned clutch release position (see Figs. 2, 10 and 11) because the foot lever 58 has been forced down and is held down against the rollers 56 to move the clutch levers into clutch release position shown in Figs. 10 and 11.

When it becomes necessary to rotate the drum, the driver merely pulls the handles 120 toward him to cause the pin 133 to engage the lower cam edge of cam member 119 and thereby to force plate 124 out of engagement with the ratchet teeth 65. This pulling, of course, disengages the notch 129 from the stop plate 130 to release the drum; the chain 70 and springs 69 and 79 (connected to the bar 80 fixed at the rear of the machine) raise the foot lever 58 about its pivot 60 to release the rollers 56 and allow the springs 48 and 41 (Figs. 10 and 11) to operate the clutch levers 45 and 23 to move the clutch element 19 into locked engagement with the clutch element 20. The clutch levers and elements then assume the positions shown in 1 and 11.

When the clutch engaging operation just described has been performed, the spring 79 has acted on the cross bar 78 to pull the bar 80 toward the rear of the machine. The valve control handles 86, in contact with the set screws 93 on the projections 92 fixed to bar 81, are then moved along with bar 81 upwardly along the arcuate guide 87 until they contact with micrometer screws 89 on the adjustable stop. The handles 86 constantly tend to move up against the top of the arcuate guide because the spring cables 97 and the spring tensioned plate 98 are in constant tension and normally hold the plate 96 down in the dotted line position (Fig. 3) and act through the crank ends 94 of rods 85 to raise the handles 86.

Of course, when the drum is rotating, either handle or both may be manually operated to raise the plate 96 bodily or to raise only one end thereof. On making a turn it is desirable to raise only one end thereof in order to close the valves at the inside of the turn and diminish the valve openings from full opening at the outside of the turn to zero opening at the inside.

The drum locking and clutch releasing operation is just the reverse of that described and will be obvious from inspection of the drawing. The handle 20, when all parts are in released position, is merely pushed away from the driver to cause the pin 132 to slide over the upper straight part of cam member 119 and depress lever 58 and cam plate 124 until the plate 124 engages the first tooth of the ratchet 65. This operation just barely moves the clutches, but it positions lever 120 so that its notch 129 is projected into the path of the stop 130. When stop 130 engages notch 129, it pulls the levers 120 and 58 downwardly until the clutches are completely released; and the momentum of the drum continues movement of these parts until the plate 124 engages the last notch 65 of the ratchet plate 58. This locks the drum against rotation, without stopping the team or other power drawing the machine, and positions the drum with valves all closed and the doors on top ready for filling. The foot plates 67 may be operated by the feet of the operator, either alone or in conjunction with the handle 120 to effect the drum locking and clutch releasing operation.

What I claim is:

1. In a seed sower, a frame, a drum rotatably mounted thereon, and having apertures therethrough, cages fixed on the outside of said drum and a plurality of gravity actuated ball valves carried by said drum to close and open said apertures in certain positions of said drum.

2. In a seed sower, a frame, a drum rotatably mounted on said frame and having a plurality of material discharging apertures therethrough, means for rotating said drum, and gravity actuated ball valves on said drum and movable toward and from seating and closing position on said apertures to control the discharge of material therefrom.

3. In a seed sower, a frame, a drum rotatably mounted thereon and having a plurality of rows of discharge apertures therethrough, and gravity actuated valves on the outside of said drum controlling said apertures, and means on said drum for closing all the valves of each row simultaneously.

4. In a seed sower, a rotatable drum having a plurality of rows of discharge apertures, gravity actuated valves controlling said apertures, and manually operable means wholly outside of said drum for moving said valves against gravity to close said apertures.

5. In a seed sower, a frame, a drum rotatably mounted thereon, and having a plurality of rectilinear rows of discharge apertures therethrough, and cooperating means mounted on said frame and drum on opposite sides of said drum to close the apertures on said sides as the drum rotates.

6. In a seed sower, a frame, a drum rotatably mounted thereon and having a plurality of rows of apertures therethrough, closures on said drum for said apertures, and cooperating means on said frame and drum on opposite side thereof to close all the apertures of the each row simultaneously as the drum rotates.

7. In a seed sower, a frame, a drum rotatably mounted thereon and having a plurality of rectilinear rows of apertures spaced around the periphery thereof, closures for said apertures, a plurality of rods extending lengthwise of each row and in contact with said closures, and means on opposite sides of said drum to contact with and move said rods as the drum rotates to move said closures to close said apertures simultaneously.

8. In a seed sower, a frame, a drum rotatably mounted thereon and having a plurality of discharge apertures therethrough arranged in annular rows around the periphery of the drum, valve mechanism having a cage fixed to and projecting from the drum over each aperture, and a seed scattering guard skid mounted on said vehicle below and in alinement with each annular row of apertures.

9. In a seed sower, a skeleton frame, a pair of wheels on opposite ends thereof, a drum rotatably mounted in said frame, clutch mechanism for transmitting the rotation of said wheels to said drum, gravity actuated valves controlling the discharge of material from said drum, tensioned cables mounted on said frame and on opposite sides of said drum to hold all the valves on said sides closed, and means on said frame for simultaneously closing all the remaining open valves and stopping the rotation of said drum independently of the rotation of the vehicle wheels.

10. In a seed sower, a skeleton frame, a drum rotatably mounted thereon, and having a plurality of rectilinear rows of discharge apertures arranged around the periphery thereof, a valve controlling each aperture and manually controlled means operating all the valves in each row to close the aperture at one end of a row and leave the aperture at the other end fully open with each intermediate aperture partly closed and varying in extent of closure in direct proportion to its distance from either end of said row.

11. In a seed sower, a wheel supported skeleton frame, a material discharging drum mounted rotatably in said frame, normally engaged spring controlled clutch mechanism for transmitting the rotation of said wheels to said drum, valve mechanism controlling the discharge of materials from said drum, and means on said frame for simultaneously disengaging said clutch mechanism and locking said drum against rotation and operating said valve mechanism to cut off discharge of materials from said drum.

12. In combination, a supporting frame, a drum rotatably mounted in said frame and having a plurality of discharge apertures through its periphery, closures for said apertures, yielding cam members mounted on said frame in spaced relation and circumferentially of the drum on opposite sides thereof, leaving a free space below the drum, rods extending longitudinally of said drum and in contact with said closures and adapted to contact with said means to force said closures into apertures closing contact with said drum.

13. The combination specified in claim 12, and means extending circumferentially of and below said drum and bridging the free space between the adjacent lower ends of the cam members, and adapted to be actuated to coact with said rods to force the closures between said ends into aperture closing contact with said drum.

In testimony whereof I affix my signature.

WILLIAM S. AUSTIN.